(12) United States Patent
Ly (10) Patent No.: US 11,295,630 B2
(45) Date of Patent: Apr. 5, 2022

(54) LANGUAGE LEARNING ASSEMBLY AND METHOD OF USE

(71) Applicant: Binh Ly, Apopka, FL (US)

(72) Inventor: Binh Ly, Apopka, FL (US)

(73) Assignee: Lilyza LLC, Fort Lauderdale, FL (US)

(*) Notice: Subject to any disclaimer, the term of this patent is extended or adjusted under 35 U.S.C. 154(b) by 0 days.

(21) Appl. No.: 17/428,191

(22) PCT Filed: Mar. 7, 2020

(86) PCT No.: PCT/US2020/021600
§ 371 (c)(1),
(2) Date: Aug. 3, 2021

(87) PCT Pub. No.: WO2020/185633
PCT Pub. Date: Sep. 17, 2020

(65) Prior Publication Data
US 2022/0044588 A1    Feb. 10, 2022

Related U.S. Application Data (60) Provisional application No. 62/815,398, filed on Mar. 8, 2019.

(51) Int. Cl.
| | | |
|---|---|---|
| G09B 1/02 | (2006.01) | |
| G09B 19/04 | (2006.01) | |
| G09G 5/02 | (2006.01) | |
| G09B 1/32 | (2006.01) | |

(52) U.S. Cl.
CPC ............ *G09B 19/04* (2013.01); *G09B 1/325* (2013.01); *G09G 5/02* (2013.01)

(58) Field of Classification Search
CPC .............. G09B 1/00; G09B 1/02; G09B 5/00
USPC .......................... 434/167, 169, 171, 172, 176
See application file for complete search history.

(56) References Cited

U.S. PATENT DOCUMENTS

| | | | | |
|---|---|---|---|---|
| 5,349,129 | A * | 9/1994 | Wisniewski | G10H 1/32 446/2 |
| 5,511,980 | A * | 4/1996 | Wood | G09B 1/04 434/169 |
| 6,353,168 | B1 * | 3/2002 | Sosoka, Jr. | G10H 1/0008 446/397 |
| 6,464,503 | B1 * | 10/2002 | Heit | G09B 19/04 434/156 |
| 6,729,881 | B2 * | 5/2004 | Marcus | G09B 3/02 434/156 |

(Continued)

FOREIGN PATENT DOCUMENTS

KR        101539409 B1    7/2015

*Primary Examiner* — Kurt Fernstrom
(74) *Attorney, Agent, or Firm* — Mark C. Johnson; Johnson Dalal (57) ABSTRACT

A language learning assembly includes a body having at least one first recess and at least one second recess arranged parallel to the at least one first recess. A plurality of blocks are color-coded by syntax category or "parts of speech" and have a plurality of words displayed on each block. The blocks are sized to fit side-by-side within one of the at least one first recess and the at least one second recess to form grammatically correct sentences. Each block can have a different word on at least two faces thereof. Some of the blocks can be configured to display words in a fixed fashion. Some of the blocks can have electronic displays configured to display words electronically.

10 Claims, 8 Drawing Sheets

(56) References Cited

U.S. PATENT DOCUMENTS

| | | | |
|---|---|---|---|
| 6,991,509 B1 * | 1/2006 | Carley | A63H 5/00 |
| | | | 434/334 |
| 9,111,463 B2 * | 8/2015 | Dobbs | G09B 19/04 |
| 10,229,613 B2 * | 3/2019 | Kim | A63H 30/04 |
| 2002/0009696 A1 | 1/2002 | Lui | |
| 2004/0197749 A1 | 10/2004 | Goldman | |
| 2009/0058002 A1 * | 3/2009 | Hou | A63F 9/06 |
| | | | 273/156 |
| 2014/0255885 A1 | 9/2014 | Ryu | |
| 2015/0133023 A1 * | 5/2015 | Lewis | A63H 33/26 |
| | | | 446/91 |
| 2017/0330473 A1 | 11/2017 | Hong et al. | |

\* cited by examiner

LANGUAGE LEARNING ASSEMBLY AND METHOD OF USE

This is a national stage filing of PCT/US2020/021600, filed Mar. 7, 2020, which claims the benefit of U.S. Provisional Application Ser. No. 62/815,398, filed Mar. 8, 2019.

BACKGROUND

U.S. Pat. Nos. 5,458,338 and 4,419,080 teach methods and apparatus for teaching grammar using a game or using cards. U.S. Pat. Nos. 1,542,031; 3,333,351; 3,728,800; 6,685,477; 7,018,210; 7,832,728; and 8,202,099; and US published application US2007/0099159, describe blocks or other game pieces with indicators for learning language structure or for playing a language game.

The present inventor has recognized the desire to provide a more effective system for teaching sentence structures that allows the user to more easily understand and retain sentence structure and vocabulary. The present inventor has recognized the desire to provide a more effective system for teaching multiple languages having different syntax and sentence structures.

SUMMARY

The invention described herein provides a language learning assembly and method of use that overcomes known disadvantages of those known devices and methods of this general type and that effectively and efficiently helps users learn a language, sentence structure in said language, and application of syntax associated therewith.

The exemplary embodiments of the invention provide a language learning assembly. The assembly comprises a learning aid body defining a first row of a plurality of first recesses disposed in a substantially aligned configuration and defining at least one second recess disposed beneath and adjacent to the first row. A plurality of blocks have a plurality of sides, each block with an syntax indicia disposed thereon, wherein each of the plurality of blocks is associated with a syntax category or "parts of speech" and shaped and sized to be received in at least one of the first recess and the second row of the plurality of recesses to form a sentence structure. The syntax indicia can be a portion of the cubes being color-coded or other indication on each block.

The exemplary embodiments of the invention provide a language learning assembly, comprises a body having at least one first recess and at least one second recess arranged parallel to the at least one first recess. A plurality of blocks are color-coded or otherwise indicated by syntax category or "parts of speech" and have a plurality of words or the like displayed on each block. The blocks are sized to fit side-by-side within one of the at least one first recess and the at least one second recess. Each block can have a different word on at least two faces thereof.

Some of the blocks can be configured to display words in a fixed fashion. Some of the blocks can have electronic displays configured to display words electronically. The body can have an electric charging circuit for charging the electronic displays. Some of the blocks can be configured for wireless communication. Some of the blocks can be in communication wirelessly with an external database. Some of the blocks can be in communication wirelessly with other blocks. Some of the blocks have electronics responsive to voice commands. Some of the blocks can be square cubes and some of the blocks are rectangular cubes with a length greater than a width of each rectangular cube. The rectangular cubes can have words displayed electronically on a top face of the rectangular cube.

Electronic versions of the exemplary assembly can be made so that the body and cover together and containing the assembly is small enough to be carried in a user's pocket or in a purse. Students can pull out the assembly, open the tray, and learn how to create sentences with all of the language elements readily available.

A basic version of the assembly with pre-printed cubes or prisms of words and guides or trays can be made for use at home or at school on a table. The basic assembly could be packaged like a game board with bags of cubes and prisms and trays or guides. One or more users or players can participate in the game of creating questions and answers in a new target language to be learned by the users or players.

DETAILED DESCRIPTION

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Provisional Application Ser. No. 62/815,398, filed Mar. 8, 2019.

The following are detailed iteration of how the products will be packaged and used. These iterations can apply to English or any other language. Non-English language would have different "sequences" in sentence structures, but the components or elements of languages are generally universal, e. g., subject (I, you, he, she . . . ), verbs, conjunctions, punctuations, etc.

Figure 1:
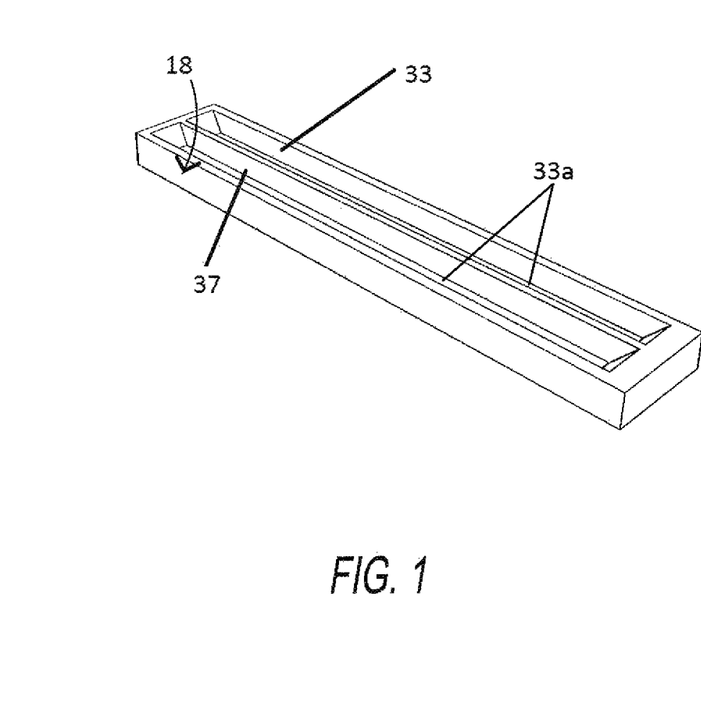
FIG. 1 is a front perspective view of a cover, shown inverted, of an exemplary embodiment apparatus of the invention.
Figure 2:
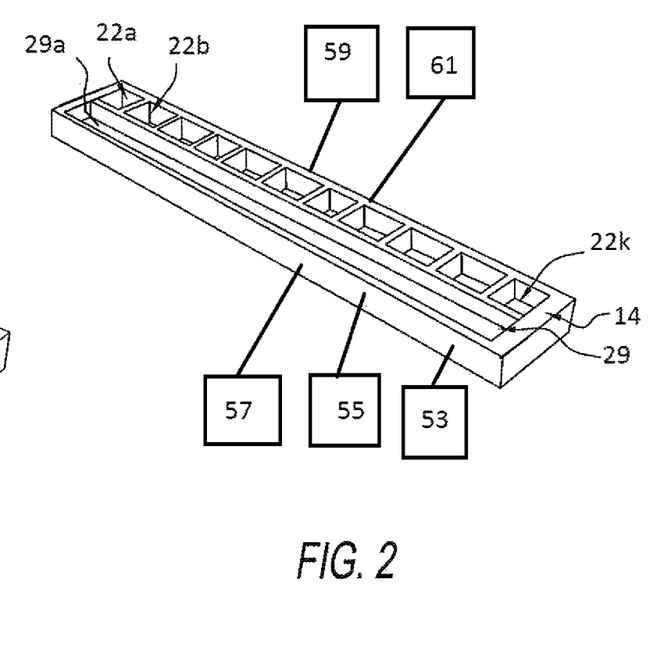
FIG. 2 is a front perspective view of a bottom tray of the present invention.
Figure 3:
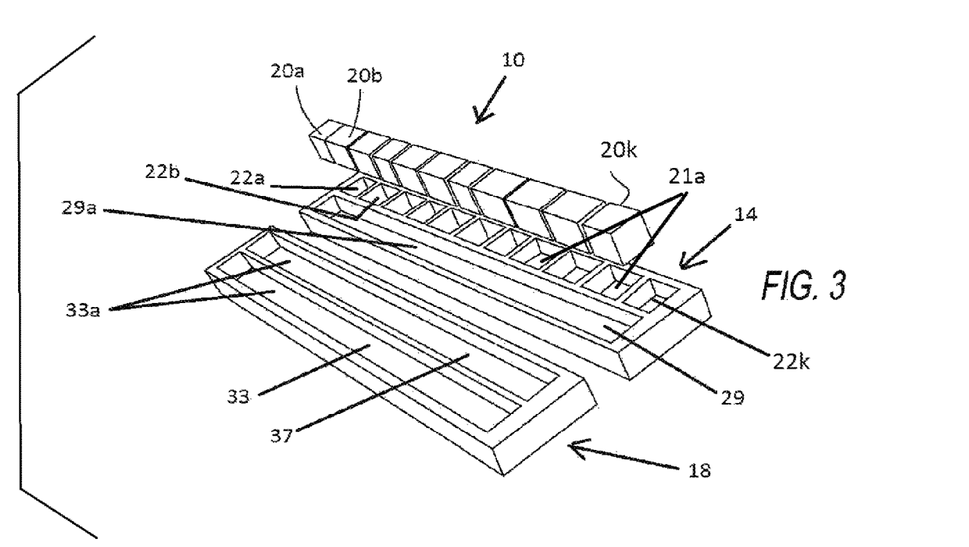
FIG. 3 is an exploded front perspective view of the embodiment of the apparatus as shown in FIGS. 1 and 2, with question blocks.

FIGS. 1-3 describe an embodiment of a language learning assembly 10. The assembly 10 includes a bottom tray 14, a cover 18 and a set of question blocks 20*a* through 20*k*. Although 11 question blocks are shown, any number of blocks is encompassed by the invention. The cover 18 is configured to be useful to package the assembly in a contained unit when the cover overlies the tray 14, and to be useful when removed to be a functional part of the teaching assembly. The cover is shown inverted in FIGS. 1-3 to be useful as a functional part of the teaching assembly. The blocks 20a-20k are language blocks arrangeable to construct a question.

The cover can be inverted from the position shown in FIGS. 1-3 and placed over the tray to contain blocks and prisms inside for storage, retail and transportation. Provisions can be made between the tray and cover to releasably hold them together, such as a snap engagement, a latch or other known means.

According to the illustrated embodiment, there are 11 question blocks 20a-20k. Although 11 blocks are shown any number of blocks is encompassed by the invention. The question blocks 20a-20k are placed in 11 compartments or recesses 22a-22k in the bottom tray 14. Although 11 compartments 22a-22k are shown, any number of compartments is encompassed by the invention. In one embodiment, the compartments 22a-22k are substantially or completely enclosed with an open top, while in other embodiments, they are continuously and spatially coupled together, i.e., there is one continuous channel recess. The recesses 22a-22k may be substantially aligned or disposed in an aligned configuration to define a first row 23. The tray 14 may also define one recess 29 or a plurality of recesses 31a-31k disposed in a substantially aligned configuration to define a second row 30 disposed parallel to, and adjacent to, the first row 23.

Four out of the 11 blocks 20a-20k can be cubes and each have words or the like displayed on each face of the cube. Each cube corresponds to a syntax category or "parts of speech": W, S, AR, and Punc. The reference W corresponds to question words, such as "what," "which," "where," "when," "who," "why," and "how." The reference "S" corresponds to subject nouns. The reference "AR" corresponds to articles such as "a," "an," "the," "this," "that," "these," "those." The reference "Punc" corresponds to punctuation, such as a period, a question mark, etc. To be clear, the category references W, S, AR and Punc are not displayed on the cubes; plural words or punctuations corresponding to the category references are displayed on faces or sides of the cubes (see FIGS. 6 and 7).

For each of the cubes W, S, AR, Punc, of the question blocks 20a-20k, the corresponding words are each printed on one face or side of the cube such that the orientation of the cube will display the selected word. If more words are needed than available sides of the six sides of the cube, additional cubes can be provided or plural words can be displayed on a face of the cube. For example, for the AR cube, one of the words "a," "an," "the," "this," "that," or "these/" those" can be displayed on each of the six faces of the cube. The cubes can be color coded as follows: W (orange), S (blue), AR (white), Punc (red).

Seven of the 11 question blocks 20a-20k shown are learning structures 41 in the form of cubes, or rectangular prisms or polyhedrons. The syntax categories or "parts of speech" shown are: Nouns1, Verb1, Verb2, Verb3, Adv (adverbs), Adj (adjectives), and Nouns2. The prisms or cubes can be square or elongated rectangular prisms. The prisms are color coded as follows: Verbs1, Verbs2, Verbs3 (green), Nouns1 and Nouns2 (light yellow), adjectives and adverbs (darker yellow). Although pre-printed words can be displayed on the prisms, the exemplary embodiment includes changeable electronic words displayed on the prisms.

Figure 3A:
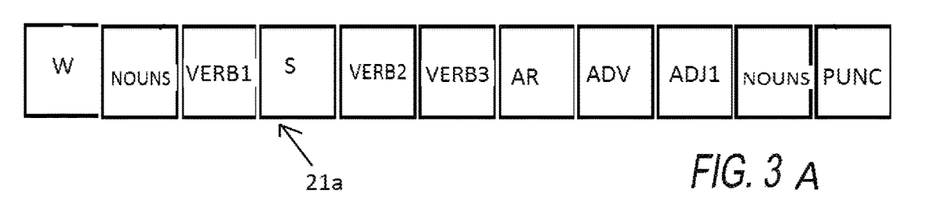
FIG. 3A is a plan view of a Question Guide taken from FIG. 3.

FIG. 3A illustrates a Question Guide 21a which can be applied to the bottom floor of the compartments 22a-22k, one syntax indicia for each compartment 22a-22k, or if one elongated recess is provided for the question blocks the guide is applied within the one recess. The Question Guide assists in forming a question with proper syntax and grammar. The syntax indicia or "parts of speech": W, Nouns, Verb1, S, Verb2, Verb3, AR, ADV, ADJ1, Nouns and Punc can be labeled as letters and/or color coded as described above.

Figure 4:
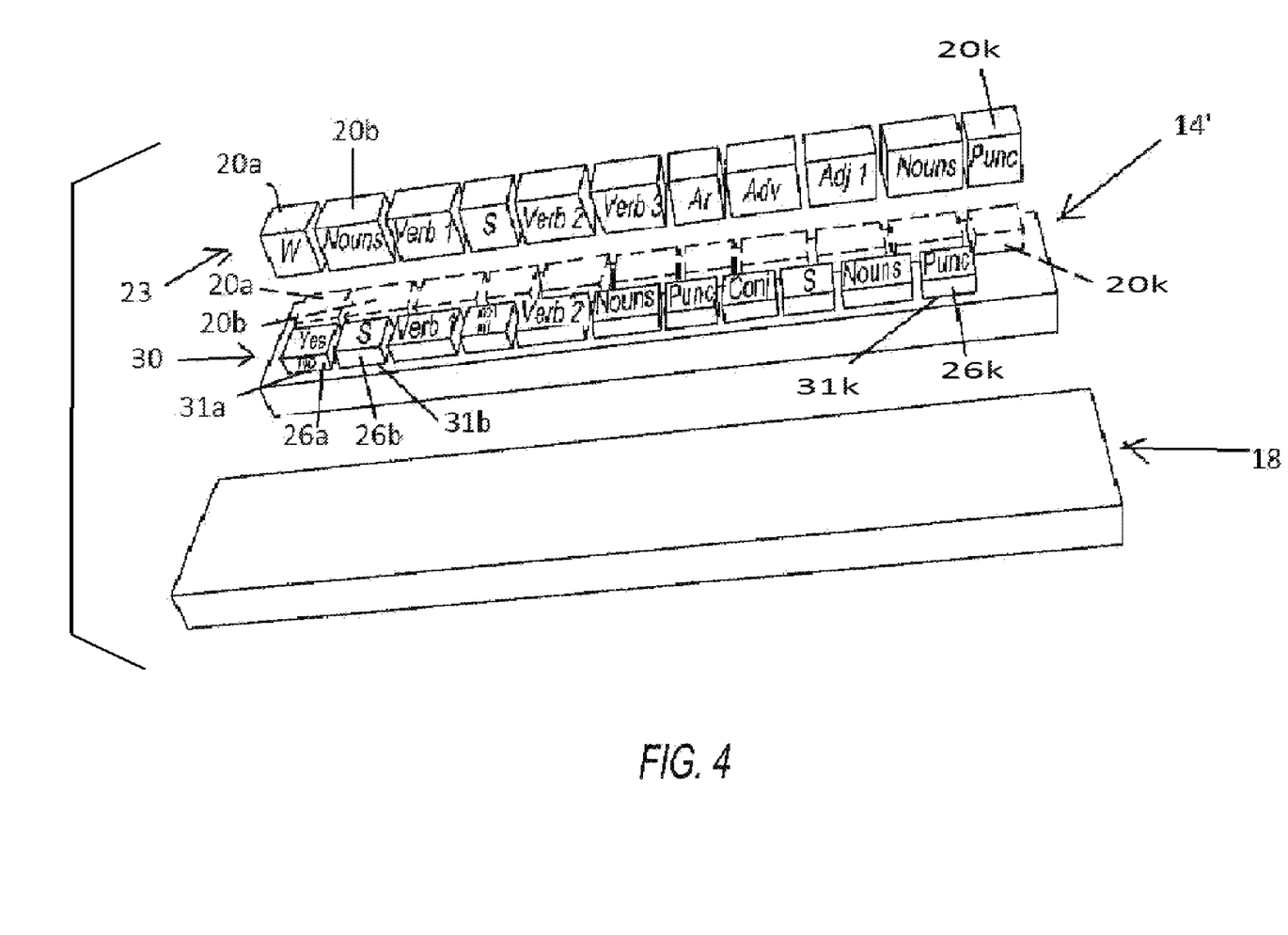
FIG. 4 is an exploded front perspective view of the apparatus of FIG. 3 with answer blocks.

FIG. 4 shows the question blocks 20a-20k both elevated from the tray 14' and placed in the tray (dashed).

Answer blocks 26a-26k are shown in FIG. 4. Although 11 answer blocks are shown, any number of blocks is encompassed by the invention. The answer blocks 26a-26k can include many of the same blocks already described in the question blocks 20a-20k but can also include additional fixed labeled cubes pre-printed for: possessive pronouns (my, mine, yours, his, hers, ours, theirs); conjunctions (and, or, but); time place (while, meanwhile, here, over here, there, over there); conditional (if, then); object Pronouns (me, you, him, her, us, you, them); logic expressions (therefore, hence, so, then, thus); prepositions (with, to, for, about, of, in); determiners (this, these, that, those). Fixed labeled cubes can also be made for frequently used verbs to be (am, are, is, was, were, being, been) or (can, could, will, would, shall, should, has, have, had). Additional prism electronic blocks, such as learning structures 41, as extras for verbs, nouns, adjectives, adverbs, can be pre-placed and pre-packaged in the bottom tray in a long undivided row (FIG. 2.) Some of the question blocks 20a-20k can be reused in the answer blocks 26a-26k.

The tray 14 shown in FIGS. 2 and 3 includes an elongated recess 29 to receive plural answer blocks 26a-26k, aligned in a row. The modified tray 14', shown in FIGS. 4 and 5, includes an answer compartment that includes sub-compartments 31a-31k (FIG. 5) to receive plural answer blocks 26a-26k, one recess for receiving one answer block 26a-26k. The cover 18 shown in FIGS. 1, 3 and 4 can also include one or more compartments 33, 37 for receiving answer blocks. The cover is illustrated having single, elongated compartments 33, 37, although the compartments can be divided into sub-compartments like 31a-31k. In FIG. 4, the cover is turned over for use as a cover over the tray 14' rather than as a learning functional element to hold blocks.

Figure 3B:
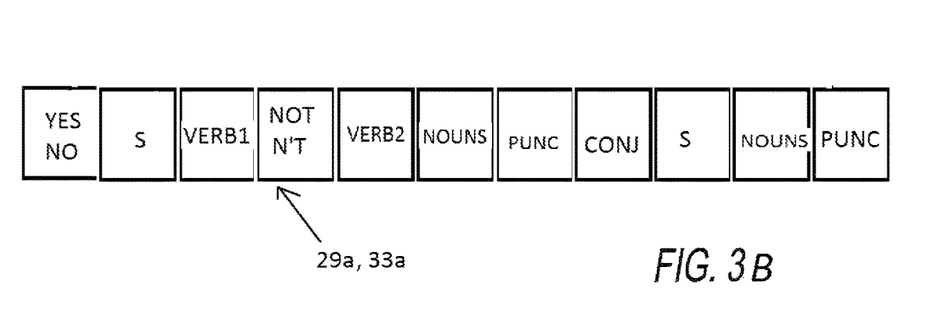
FIG. 3B is a plan an Answer Guide taken from FIG. 3.

On the floor of the compartments 31a-31k of the tray 14' of FIG. 4, or on the floor of the recess 29 of the tray 14 of FIG. 3, is a short Answer Guide 29a (FIG. 3B) with color coded instructions and/or labeled syntax indicia, such as labeled in FIG. 3B, which teach sentence structure by indicating the order and placement of answer blocks according to color for correct syntax and grammar. The compartments 33, 37 in the cover 18 include on a floor thereof a long answer guide 33a with color-coded instructions, and/or labeled syntax indicia, for longer sentence answers. For example, one or both compartments 33, 37 could be used to construct a long sentence according to a long Answer Guide (not shown).

The answer set of blocks 26a-26k can include additional fixed labeled cubes. The number of additional fixed labeled cubes will depend on the target language to be learned. For English, for example, 8 to 10 cubes can be adequate. Also, if more space is needed for containing more cubes, or prisms, an additional container, or bag, of cubes and prisms will be included with the product package.

Figure 5:
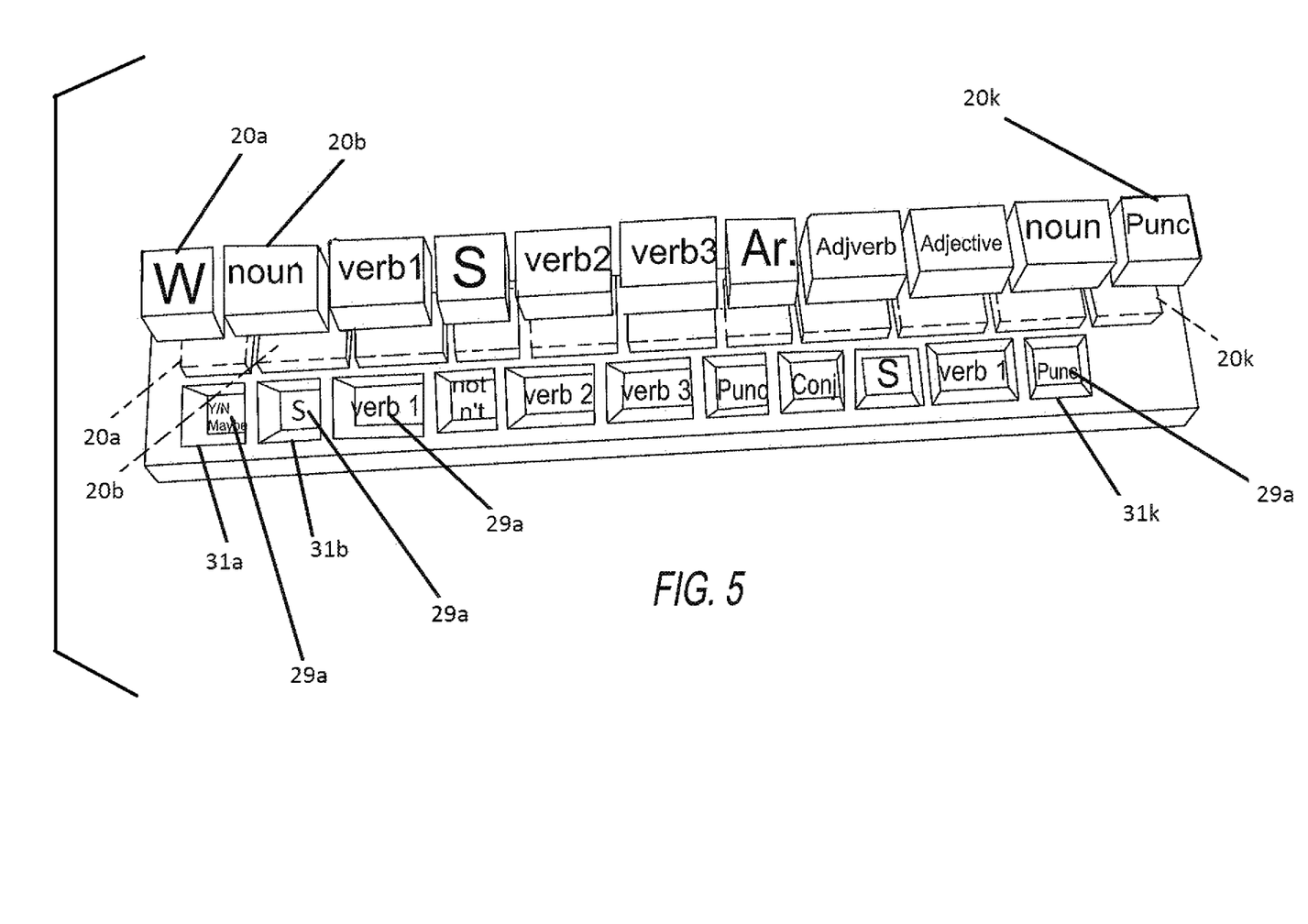
FIG. 5 is an exploded top perspective view of an alternate embodiment, modified apparatus of FIG. 3 without answer blocks.

FIG. 5 shows the question blocks 20a-20k both elevated from the tray 14', and placed in the tray (dashed).

FIG. 5 illustrates the tray 14' having the answer block sub-compartments 31*a*-31*k* for each correct block and having the short answer guide 29*a* partly displayed on the floor of each sub-compartment 31*a*-31*k* which corresponds to correct sentence structure for the answer. Although 11 sub-compartments 31*a*-31*k* are shown, any number of sub-compartments is encompassed by the invention.

The tray 14, 14' can include electronics (shown schematically in FIG. 2) including a charging circuit 53 for charging and/or powering electronic or digital blocks, which can be charged when stored in the tray, wireless capabilities 55, Bluetooth capabilities 57, a memory 59, a processor 61, etc.

The tray and the cover may be of a substantially rigid material such as PVC, stainless steel, ceramic, or other material. The tray and the cover may also be flexible.

FIG. 1-5 show several advantageous features of the present invention, but the invention can be provided in several shapes, sizes, combinations of features and components, and varying numbers and functions of the components. Each of the recesses 22*a*-22*k*; 31*a*-31*k* or recesses 29, 33, and 37 defined by the tray or cover may be shaped and sized to receive a plurality of learning structures, e.g., cubes or prisms. The learning structures may be a cube, prism or another polyhedron that includes a plurality of sides, wherein each side includes a syntax indicia, such as color, disposed thereon. The learning structures are each associated with a syntax category or "parts of speech", e.g., the question gathering words, "who," "what", "when," etc., subjects, modal verbs, possessive objectives, etc.

As best described and depicted in FIG. 4, the body and learning structures are shaped and sized to be received in at least one of the first row of the plurality of enclosed recesses with open tops and the second row of the plurality of enclosed recesses with open tops to form a sentence structure, e.g., a question-forming sentence and an answer-forming sentence. Exemplary question-forming and answer-forming sentences that are correct in form and syntax are depicted in FIG. 4. As those of skill in the art will appreciate, various other sentence structures may be formed from the learning structures.

The assembly provides an easy method of learning languages in three steps:
1. Learn only seven cubes of W, S, modal verbs (V1), articles, possessive adjectives-pronouns, conjunctions, prepositions
2. Learn verbs, adverbs/adjectives, nouns in digitally stored and callable blocks
3. Choose any verb or noun, and the digital blocks will communicate via Bluetooth using container/tray as electronic base to show all possible corresponding nouns (objective nouns) or verbs in a correct sentence with all possible questions.

There are 2 types of questions: W questions or Yes/No questions. The short answer guide would be directed to a simple sentence answer: Yes, No, or descriptive sentence, to answer the W question. The long answer guide would be a compound or complex sentence with one or more subordinate clauses used with conjunctions.

Example of yes/no question: would you like to go to a movie?
Syntax: (V1) (S) (V2) (V3) (N) (punctuation).
The answers rows in the trays are labeled with colors only to show the sequenced structure of a sentence. For example:
The syntax of the answer blocks in order is: Yes or No, S, Verbs 1, Verbs 2, Adjective, Object (nonouns or pronouns), Punct.

The W questions can be changed by changing the side of W to be on top. The subject can be changed by changing side of S to be on top (I, you, he, etc.,). The first verb can be changed by changing side of Verb 1 to be on top (am, is, was, were, can, could will, would, etc.,) The second verb can be changed by changing side of Verb 2 to be on top. Verbs will also display various tenses in present, past (go, goes, going, went, gone) that the user will choose to match with Verb 1. For Yes/No questions, W block will not be used.
For example:
What are you reading? I am reading a book.
Are you reading? Yes, I am. (No, I am not.)
When did you arrive Chicago? I arrived Chicago yesterday.
Did you arrive in Chicago? Yes I did. (No, I did not.)

A printed book will be provided with grammar instruction of how question or answer sentences are structured and how to create them. In the instruction book, there are lists of 200+ common regular verbs, 100+ common irregular verbs, 3000+ common nouns, adjectives, adverbs, etc. with translation to other language so users can scan the lists and create the desired question or answer using the blocks. The electronic prisms will have 30,000+ stored words which is much more than the 3000+ common words in the instruction book.

To be fluent in speaking and understanding English, or any other language, one needs to learn how to use about 3,000 words that make up about 95% of everyday conversation.

A simpler version of the product can also be made without electronic prisms. Pre-printed words on color-coded non-electronic prisms for common verbs, common nouns, adjectives, adverbs can be packaged in a can or bag. The tray will have color-coded labels for questions and answers sentences. A basic set with 300 blocks, an intermediate set with 600 blocks, and an advanced set with more and more blocks offered as the vocabulary increases.

Figure 6:
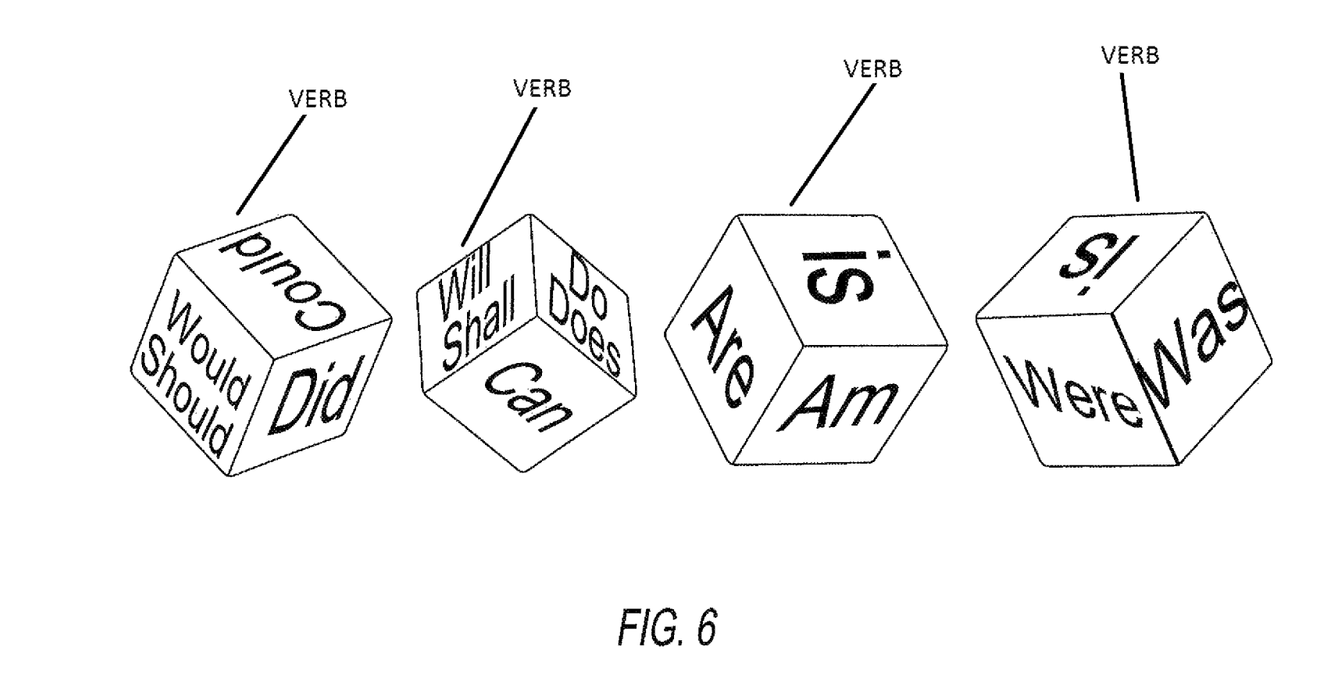
FIG. 6 is an exploded perspective view of static blocks of the apparatus taken from FIG. 4.
Figure 7:
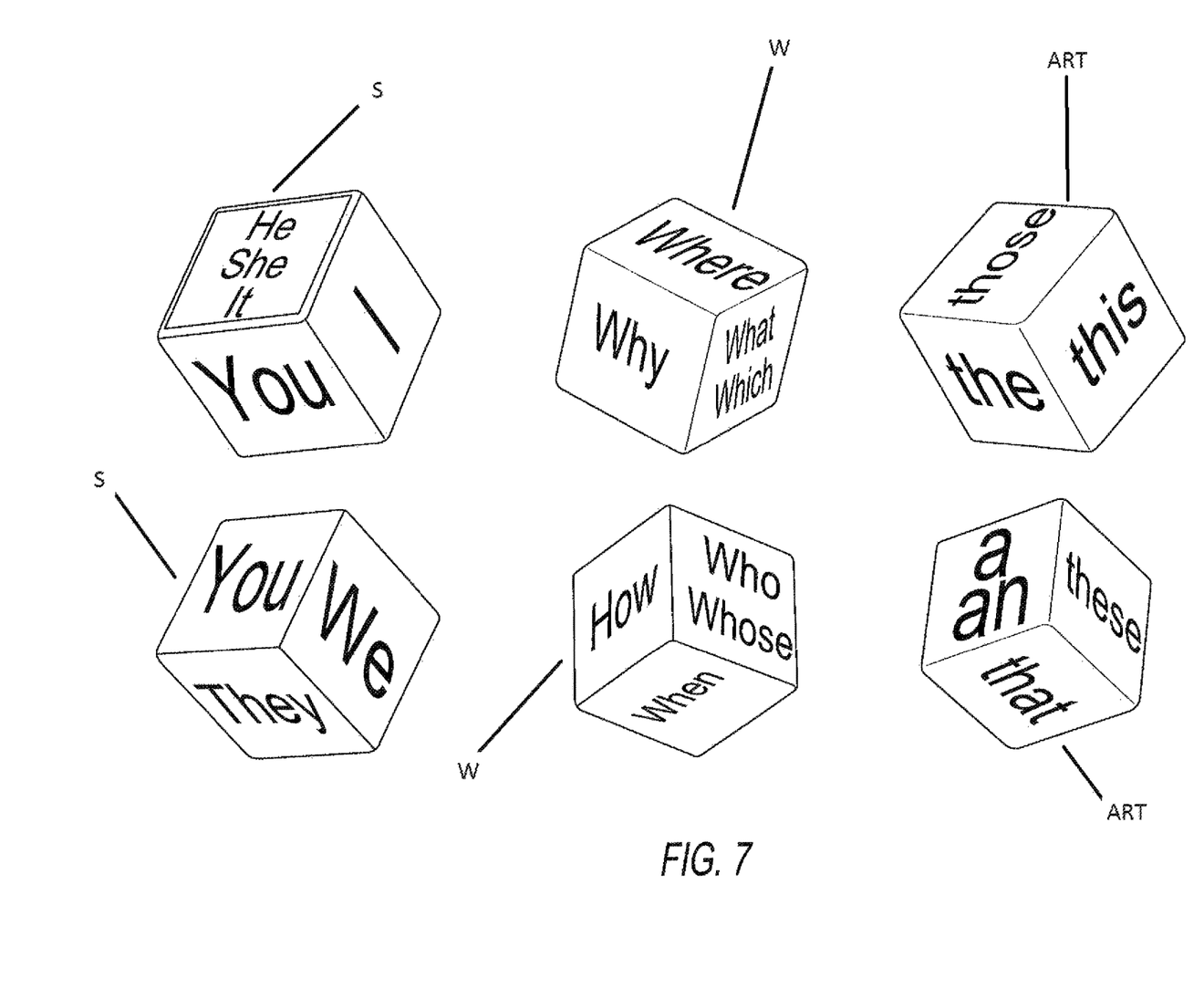
FIG. 7 is an exploded perspective view of static blocks of the apparatus taken from FIG. 4.

FIGS. 6-7 depict various learning structures in the form of question blocks 20*a*-20*k* and/or answer blocks 26*a*-26*k* that may be utilized with the assembly 10 and may be considered "static" learning structures, as the indicia disposed thereon is pre-set. Each of the learning structures may be color-coded and associated with the correct recess or placement location on the body (using the corresponding and matching color) to form the correct sentence structure. Alternatively, the indicia can be electronically displayed and changeable by the user, by other blocks, by the electronics in the tray, or remotely.

For blocks that display two or more words on one side, a provision can be made for indicating which of the multiple words is the choice by a user, such as a stick-on tag or the like.

Figure 8:
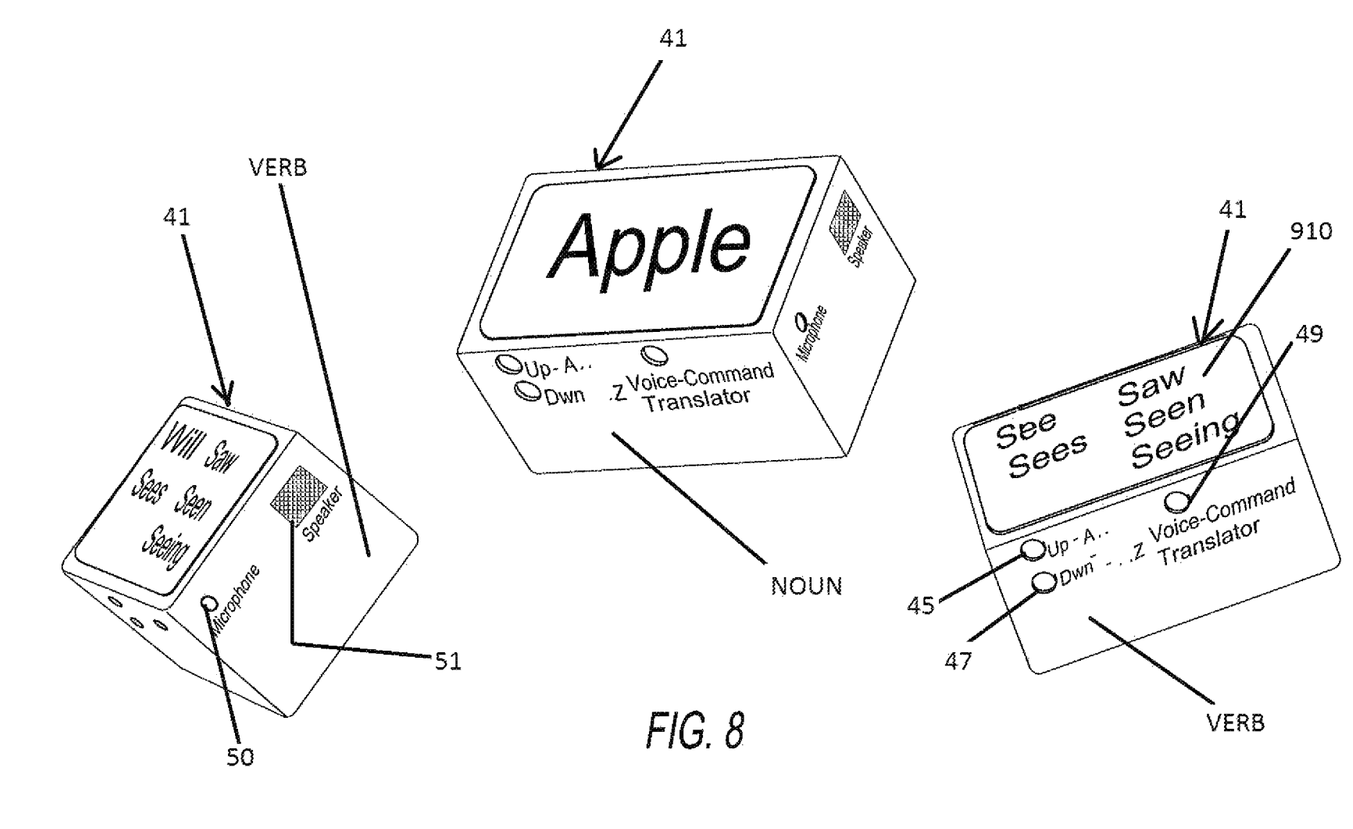
FIG. 8 is an exploded perspective view of electronic blocks of the apparatus taken from FIG. 4.

FIG. 8 depicts various learning structures 41 in the form of electronic prisms with an electronic display screen 910 disposed thereon, wherein the electronic display screen is operably configured to display one of a plurality of digitally stored verbs, nouns, or other syntax. The learning structures 41 can include an embedded memory 906 and display A-Z scroll up/down buttons 45, 47, and/or voice command microphone 50 and associated electronics, a multilingual translator and associated electronics, and a speaker 51. By using the scroll up/down buttons 45, 47 a word can be selected by the user. It is possible that a conjugation list of a word is first displayed, and the user uses the scroll up/down buttons 45, 47 to select a correct conjugation. Instead of using the buttons 45, 47, voice commands may be used.

To select the user's choice of word from multiple displayed words, a provision can be made to highlight the chosen word, such as by double-clicking one of the buttons 45, 47 or by voice command.

While English words and syntax are depicted on the learning structures, the present invention may be used to teach all world languages, and not just English. By exchanging the learning structures and the instructional tray, or body, to show the correct structures of sentences and questions of a particular language, one can adapt to learn any and all world languages. Some languages, however, do not change verb forms when conjugated in various tenses such as Vietnamese, Chinese, Korean, Japanese, Khmer, Thai, while the Subjects of such language (pronouns) do change depending on whether it is a male or female, depending on age (older or younger), as well as family ranks etc., as in Vietnamese.

Some languages would reverse the order of article-adjective-noun to article-noun adjective (French, Spanish, Vietnamese, Khmer, etc.). Some languages would put Interrogative Words (what, when, where, . . . ) at the end instead at the beginning of the sentences (Vietnamese). Some languages put the verbs at the end (Japanese) after Subject, Object, then Verbs. Some languages have two genders, i.e., masculine and feminine. Some languages also have three genders, masculine, feminine, and neutral. English has no masculine nor feminine. In Vietnamese language, all inanimate objects are feminine, and all animate object are masculine (con, cai).

With the present invention, teachers and learners will teach and learn a fixed number of sets of subjects, pronouns, possessive adjectives, articles, conjunctions, prepositions, interrogative words in learning structures, or blocks, with colors. In one embodiment, with reference to FIGS. 8-9, the rectangular blocks associated with the syntax of: Verbs 1, Verbs 2, Verbs 3, Phrasal Verbs, Adjectives, Adverbs, Nouns, may be stored in memory 906 that is callable by scrolling A to Z or by voice recognition. Additional learning structures for Conjunctions, Prepositions, are available to make sentences longer and richer in structures. In another embodiment, the assembly 10 would have a fixed number of Cubes for Subjects, objective pronouns, and series of rectangular blocks without digital memories. In such case, rectangular blocks consist of 200+/− irregular verbs, 1000+ regular verbs, 150+/− phrasal verbs (for Latin based), and 3000+/− nouns and adjectives/adverbs that may be digitally stored in the memory 906 for selective recall.

The tray and/or cover may also be changed to increase the number of rows. The color-coded instructions on the bottom of the trays can be adapted to different languages. A booklet of instruction explains how to use the blocks and trays and how to create sentences and questions for different languages. Each set of blocks, trays and instructions are made for each particular language, which is translatable to English as the base language. Therefore, one objective of the present invention is to teach languages so that students can learn intuitively by following the colored-coded bodies, or trays, and create sentences and questions correctly in English or any other languages. Another objective is to teach and to learn a fixed number of learning structures and to expand a user's vocabulary by learning more learning structure blocks in English or any other languages. Another objective is to create "all" possible sentences from a verb or a combination of verb 1, verb 2, verb 3, with a corresponding objective noun or objective phrases in English or any other languages. Another objective is to practice and to create all possible questions from sentences with a verb, or a verb with objective nouns in English or any other languages.

Figure 9:
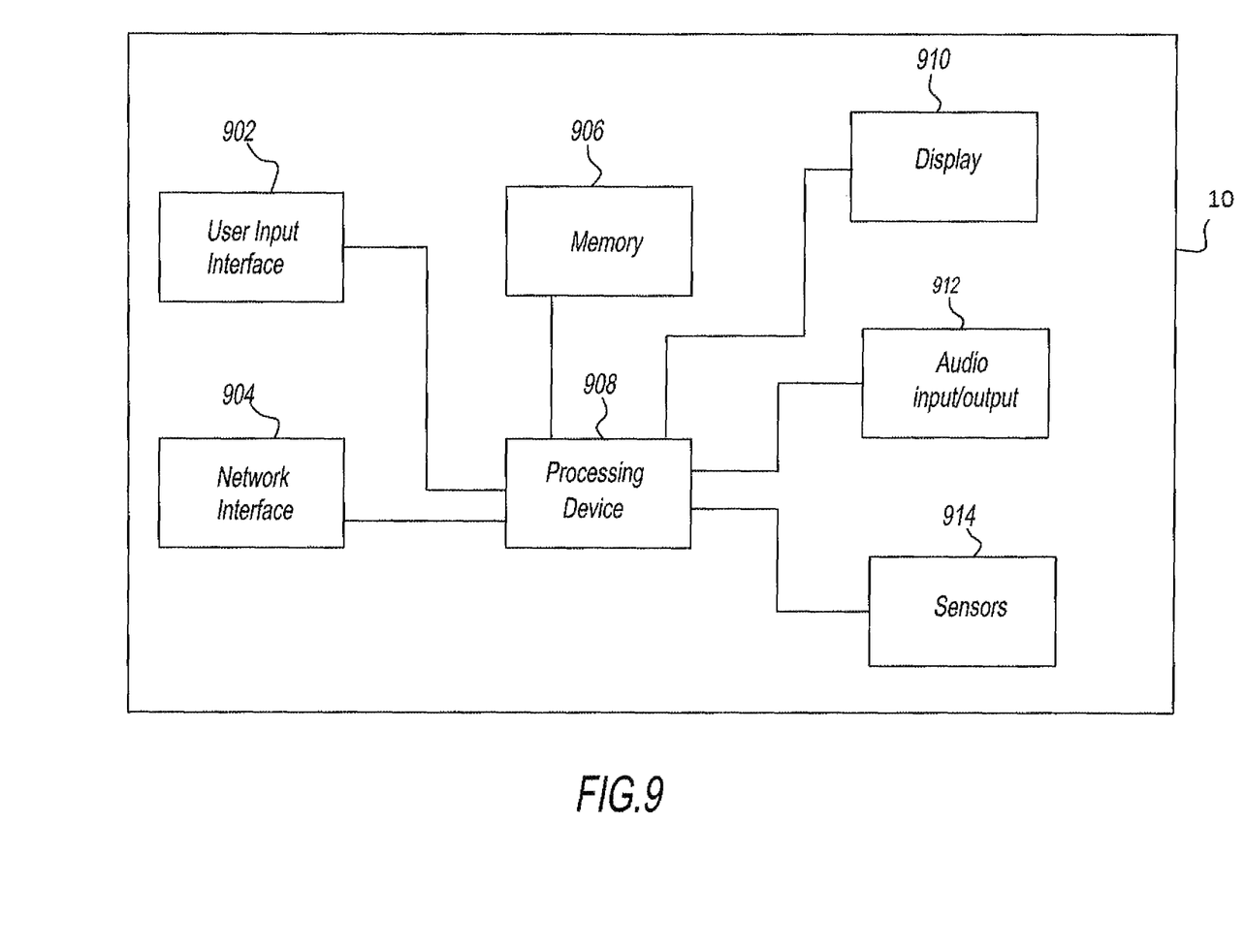
FIG. 9 is a schematic control diagram of one embodiment of the invention.

When utilizing electronics, e.g., incorporated into each learning structure 41 and/or other computing devices, an exemplary structural and communication configuration of the electronics is illustrated in an exemplary block diagram in FIG. 9. The learning structures may include a user input interface 902 such as the up/down buttons 45, 47, a network interface 904, the memory 906, a processing device 908, the electronic display 910, an audio input/output 912, such as the microphone 50, speaker 51, alarms and/or one or more sensing architecture 914 (e.g., to detect the proximity of other learning structures).

The network interfaces may include one or more network interface cards (NIC) or a network controller. In some embodiments, the network interface 904 may include a personal area network (PAN) interface. The PAN interface may provide the capability for the learning structures 41 and/or other computing devices to network using a short-range communication protocol, for example, a Bluetooth communication protocol. The PAN interface may permit one or more of the learning structures 41 and/or other computing devices to connect wirelessly to another computing device, e.g., a phone and sensor, via a peer-to-peer connection. This may be beneficial when desiring to update the memory or remove words therein.

The network interfaces may also include a local area network (LAN) interface. The LAN interface may be, for example, an interface to a wireless LAN, such as a Wi-Fi network. The range of the LAN interface may generally exceed the range available via the PAN interface. Typically, a connection between two electronic devices via the LAN interface may involve communication through a network router or other intermediary device.

Additionally, the network interfaces may include the capability to connect to a wide area network (WAN) via a WAN interface. The WAN interface may permit a connection to, for example, a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

The learning structures 41 and/or other computing devices may also include a near field communication (NFC) interface. The NFC interface may allow for extremely close-range communication at relatively low data rates (e.g., 424 kb/s). The NFC interface may take place via magnetic field induction, allowing the NFC interface to communicate with other NFC interfaces located on the learning structures 41 and/or other computing devices or to retrieve information from tags having radio frequency identification (RFID) circuitry. The NFC interface may enable initiation and/or facilitation of data transfer from and to the learning structures 41 and/or other computing devices with an extremely close range (e.g. 4 centimeters).

The memory 906 associated with the learning structures or other components may be, for example, one or more buffer, a flash memory, or non-volatile memory, such as random-access memory (RAM). The learning structures 41 and/or other computing devices may also include non-volatile storage. The non-volatile storage may represent any suitable storage medium, such as a hard disk drive or non-volatile memory, such as flash memory.

The processing device can be, for example, a central processing unit (CPU), a microcontroller, or a microprocessing device, including a "general purpose" microprocessing device or a special purpose microprocessing device. The processing device executes code stored in memory to carry out operation/instructions of the learning structures 41 and/or other computing devices. The processing device may provide the processing capability to execute an operating system, run various applications, and provide processing for one or more of the techniques described herein.

Although a specific order of executing the process steps has been described herein, the order of executing the steps may be changed relative to the order shown in certain embodiments. Also, two or more steps described as occurring in succession may be executed concurrently or with partial concurrence in some embodiments. Certain steps may also be omitted for the sake of brevity. Although the invention is illustrated and described herein as embodied in a language learning assembly and method of use, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

It is to be understood that the disclosed embodiments herein are merely exemplary of the invention, which can be embodied in various forms. Therefore, specific structural and functional details disclosed herein are not to be interpreted as limiting, but merely as a basis for future claims and as a representative basis for teaching one of ordinary skill in the art to variously employ the present invention in virtually any appropriately detailed structure. Further, the terms and phrases used herein are not intended to be limiting; but rather, to provide an understandable description of the invention. It is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the body of the assembly where cubes are placed, wherein "transverse" should be understood to mean a direction corresponding to a direction opposite of the longitudinal direction. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The attached figures are incorporated in and form part of the specification and serve to further illustrate various embodiments and explain various principles and advantages all in accordance with the present invention. Moreover, it is believed that the invention will be better understood from a consideration of the following description in conjunction with the drawing figures, in which like reference numerals are carried forward.

From the foregoing, it will be observed that numerous variations and modifications may be effected without departing from the spirit and scope of the invention. It is to be understood that no limitation with respect to the specific apparatus illustrated herein is intended or should be inferred.

What is claimed is:

1. A language learning assembly, comprising:
a body having at least one first recess and at least one second recess arranged parallel to the at least one first recess, the body including an electric charging circuit;
a plurality of blocks being color-coded by syntax category and having a plurality of words displayed on each block, the blocks sized to fit side-by-side within one of the at least one first recess and the at least one second recess and at least some of the plurality of blocks having electronic displays configured to display the plurality of words electronically and configured to be charged by the electric charging circuit on the body.

2. The assembly according to claim 1, wherein each block has a different word on at least two faces thereof.

3. The assembly according to claim 1, wherein at least some of the blocks are configured to display words in a fixed fashion.

4. The assembly according to claim 1, wherein at least some of the blocks are configured for wireless communication.

5. The assembly according to claim 1, wherein at least some of the blocks are in communication wirelessly with an external database.

6. The assembly according to claim 1, wherein at least some of the blocks are in communication wirelessly with other blocks.

7. The assembly according to claim 1, wherein at least some of the blocks have electronics responsive to voice commands.

8. The assembly according to claim 1, wherein some of the blocks are square cubes and some of the blocks are rectangular prisms with a length greater than a width of each rectangular prism.

9. The assembly according to claim 8, wherein the rectangular prisms have words displayed electronically on a top face of the rectangular prism.

10. A language learning assembly, comprising:
a body having at least one first recess and at least one second recess arranged parallel to the at least one first recess;
a plurality of blocks being color-coded by syntax category and having a plurality of words displayed on each block, the blocks sized to fit side-by-side within one of the at least one first recess and the at least one second recess and at least some of the plurality of blocks having electronic displays configured to display words electronically and having electronics responsive to voice commands.

* * * * *